United States Patent [19]

Thibault et al.

[11] Patent Number: 5,783,166

[45] Date of Patent: Jul. 21, 1998

[54] PROCESS FOR PRODUCING ANTIMONY TRIOXIDE

[75] Inventors: J. Dean Thibault, New Maryland; Michael D. MacDonald, Hanwell; Donald A. Stevens, Fort Suskatchewan, all of Canada

[73] Assignee: Roycefield Resources Ltd., Moncton, Canada

[21] Appl. No.: 710,115

[22] Filed: Sep. 12, 1996

[51] Int. Cl.$^6$ ............................. C01B 9/00; C01G 30/00
[52] U.S. Cl. ............................................ 423/617; 423/491
[58] Field of Search .................................. 423/491, 617

[56] References Cited

U.S. PATENT DOCUMENTS

| | | | |
|---|---|---|---|
| 2,102,737 | 12/1937 | Peck et al. | 423/491 |
| 3,872,210 | 3/1975 | Ukaji et l. | 423/87 |
| 3,917,793 | 11/1975 | Shafer | 423/617 |
| 3,944,653 | 3/1976 | Stewart et al. | 423/617 |
| 4,078,917 | 3/1978 | Swanson | 75/101 |
| 4,391,792 | 7/1983 | Bloise et al. | 423/617 |
| 4,532,112 | 7/1985 | Nakahira et al. | 423/87 |

FOREIGN PATENT DOCUMENTS

| | | | |
|---|---|---|---|
| 1014332 | 7/1977 | Canada | 23/231 |
| 63-248724 | 10/1988 | Japan | C01G 30/00 |
| 1111726 | 4/1989 | Japan | C01G 30/00 |
| 996496 | 7/1981 | U.S.S.R. | C22B 30/06 |

OTHER PUBLICATIONS

Chemical Abstracts Citation 110:78733.

"Inorganic And Theoretical Chemistry," J.W. Mellor, vol. IX.

*Primary Examiner*—Wayne Langel
*Attorney, Agent, or Firm*—Fitzpatrick, Cella, Harper & Scinto

[57] ABSTRACT

A process for the production of antimony trioxide comprising the steps of: (i) reacting antimony trisulfide with iron (III) chloride to produce antimony trichloride; and (ii) hydrolyzing antimony trichloride to produce antimony trioxide. In a preferred embodiment, the process is substantially closed or near-closed loop. Antimony trioxide is a known flame retardant for use in plastics, ceramics and the like.

29 Claims, 1 Drawing Sheet

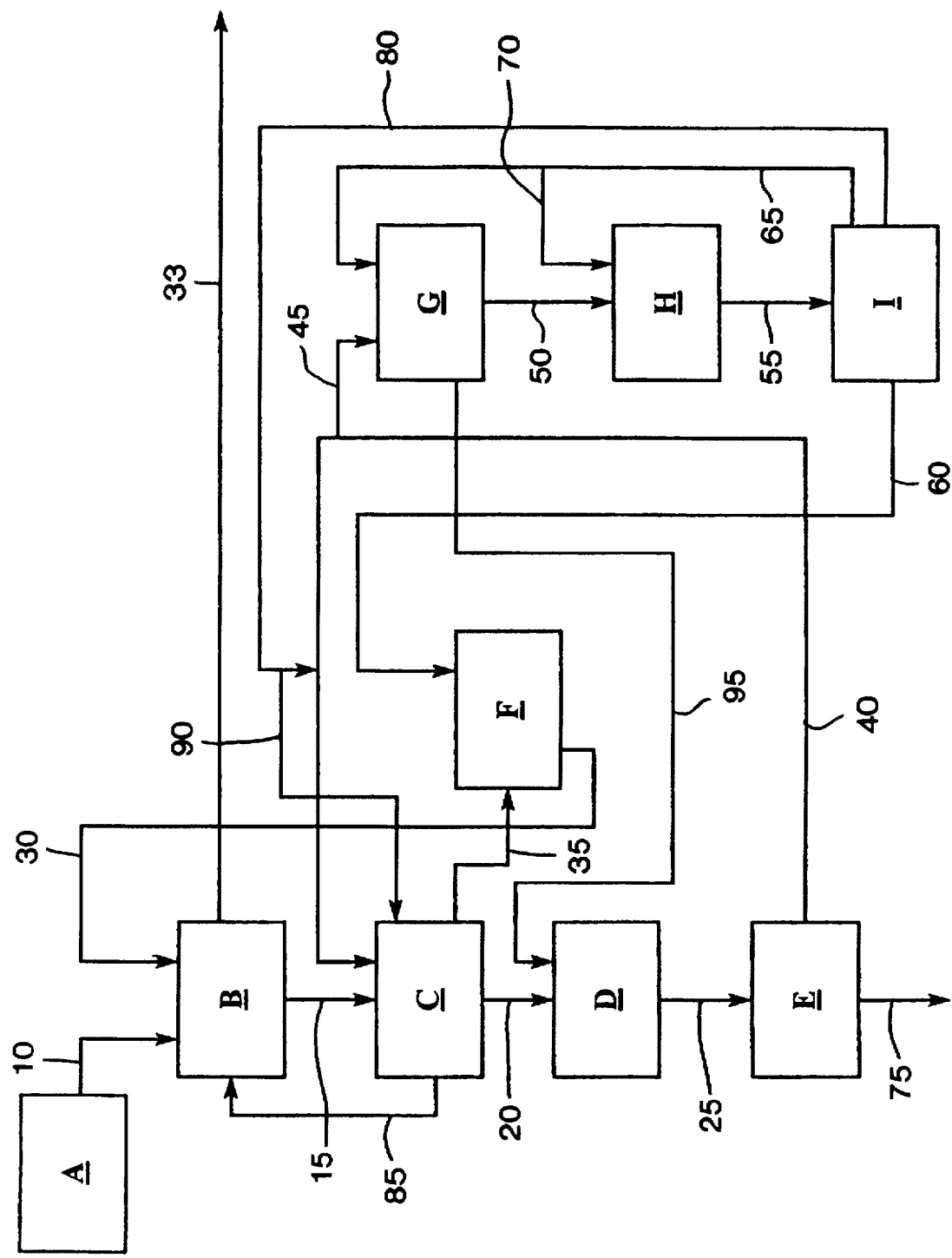

PROCESS FOR PRODUCING ANTIMONY TRIOXIDE

BACKGROUND OF THE INVENTION

1. Field of the Invention

The present invention relates to a process for the production of antimony trioxide.

2. Description of the Prior Art

Antimony trioxide, also known as antimonous oxide and/or $Sb_2O_3$, is a known compound useful in the manufacture of paints, plastics, ceramics, and the like. The principal utility of antimony trioxide is as a flame retardant.

Conventionally, antimony trioxide is produced by high temperature roasting/smelting processes using antimony trisulfide concentrate as the starting material. Antimony trisulfide concentrate contains large amounts (e.g. >80% by weight) of antimony trisulfide. The following is the principal reaction that occurs during conventional roasting/smelting:

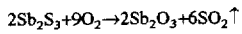

$$2Sb_2S_3 + 9O_2 \rightarrow 2Sb_2O_3 + 6SO_2 \uparrow$$

One of the principal concerns in conventional production of antimony trioxide is the concurrent production of $SO_2$. Specifically, unabated release of this sulfur dioxide is known to lead to acid production which has significant detrimental effects on the environment. Thus, it is necessary to scrub sulfur dioxide emissions (for example by flue gas desulfurization technology) produced during manufacture of antimony trioxide. In a typical commercial plant using this conventional technology for production of antimony trioxide, the capital cost of scrubbing sulfur dioxide emissions can approach or even exceed two orders of magnitude more than the capital cost of the process which produces antimony trioxide.

Thus, not surprisingly, the capital cost of a commercially viable conventional roasting/smelting process can be in excess of CDN$20 million. Further, conventional roasting/smelting processes lack the flexibility to produce alternate crystalline forms of antimony trioxide (i.e. senarmontite or valentinite) or to vary the particle size distribution of the product.

Recent attempts to solve these problems include: (i) a high temperature chlorination coupled with calcium chloride reactant (Bureau de Recherches Geologiques et Minieres in Orleans, France), and (ii) high temperature chlorination coupled with hydrochloric acid reactant (Preussag GB Erdol und Chemie). Approach (i) is deficient since the need to conduct the reaction at approximately 500° C. results in a very corrosive reaction system necessitating the use of reactors made of specialized titanium alloys—this dramatically increases the capital and process maintenance costs of the plant. Approach (ii) is deficient since sulfur from the starting material is converted to hydrogen sulfide ($H_2S$) which must be scrubbed or otherwise treated to obviate or mitigate a negative impact on the environment—this also dramatically increases the capital and process maintenance costs of the plant.

Thus, while the commercial demand for antimony trioxide remains high, there is little room in an environmentally conscious world for a conventional roasting/smelting process which converts antimony trisulfide to antimony trioxide. Further, the recent attempts at improved technologies have met with little or no commercial success.

Accordingly, the art is in need of a process for production of antimony trioxide which avoids the problems of the prior art.

It would be desirable to have an improved process for production of antimony trioxide. Ideally, the improved process: (i) could be implemented at relatively low capital cost, (ii) would avoid the production of environmentally hazardous compounds such as $SO_2$ and $H_2S$, (iii) could be conducted at or near the source of antimony trisulfide, and/or (iv) would minimize the need for large quantities of virgin reagents (i.e. reagents used in the improved process could be readily recycled to provide a closed or near-closed loop reaction system).

SUMMARY OF THE INVENTION

It is an object of the present invention to obviate or mitigate at least one of the above-identified disadvantages of the prior art.

Accordingly, the present invention provides a process for the production of antimony trioxide comprising the steps of:

(i) reacting antimony trisulfide with iron (III) chloride to produce antimony trichloride; and (ii) hydrolyzing antimony trichloride to produce antimony trioxide.

Thus, in the present process antimony trisulfide is reacted with iron (III) chloride to produce an antimony trichloride intermediate which can be readily converted to antimony trioxide. The present process is ideally suited to utilize antimony trisulfide concentrate as a starting material. As is known in the art, antimony trisulfide concentrates may be produced by flotation techniques to produce a concentrate material which contains at least about 70% by weight, preferably at least about 90% by weight, antimony trisulfide. The remainder of the concentrate comprises silica and heavy metal impurities.

As will be described in more detail hereinbelow, a key advantage of the present process is that the production of environmentally hazardous by-products (i.e. materials which can not be recovered and must be treated (at large capital cost) prior to emission) is avoided. Thus, in the present process the by-products of each reaction and/or treatment step may be recycled and reused without emission into the environment. The result of this is that the present process is a closed or near-closed loop system which does not require large amounts of virgin bulk reagents. Solid by-products produced (e.g. silica, trace amounts of heavy metal and the like) may be disposed of relatively easily. This is a highly advantageous feature of the present process since it obviates or mitigates shipment of large quantities of reagents and other materials needed for the process thereby facilitating commercial implementation of the process in remote locations.

The present process does not require the use of capital cost intensive scrubbers and other capital cost intensive by-product treatment technologies. Thus, the present process may be implemented on a commercial scale at relatively low capital cost compared with a commercially viable conventional roasting/smelting plant incorporating scrubbers to dealing with sulfur dioxide emissions.

Further, the ability to implement the present process at relatively low temperatures and substantially ambient pressure serves to enable a reduction in relative overall costs associated with operation of the present process on a commercial scale.

BRIEF DESCRIPTION OF THE DRAWING

Embodiments of the present invention will be described with reference to the accompanying FIGURE which is a schematic of an embodiment of the present process.

DETAILED DESCRIPTION OF THE PREFERRED EMBODIMENTS

With reference to the accompanying FIGURE, there is illustrated a holding tank A which serves to hold a supply of antimony trisulfide concentrate. Holding tank A is connected to a leach station B via a line 10. Leach station B is connected to a solvent extraction station C via a line 15. Solvent extraction station C is connected to leach station B via a line 85. Solvent extraction station C is connected to a hydrolysis station D via a line 20. Hydrolysis station D is connected to a dewatering/drying station E via a line 25.

A line 30 connects a chlorination station F to leach station B. Solvent extraction station C is connected to chlorination station F via a line 35. A line 40 connects dewatering/drying station E to solvent extraction station C.

A line 45 connects line 40 to an ammonium recovery station G. Ammonium recovery station G is connected to a brine purification station H via a line 50. Brine purification station H is connected to a chloro-alkali electrolysis station I via a line 55.

A line 60 connects chloro-alkali electrolysis station I to chlorination station F. A line 65 connects chloro-alkali electrolysis station I to ammonium recovery station G. A line 80 connects chloro-alkali electrolysis station I to line 40. A line 90 connects line 80 to solvent extraction station C. A line 70 connects line 65 to brine purification station H.

In the context of the illustrated embodiment, the present process can be operated in the following manner.

Antimony trisulfide is metered from holding tank A to leach station B via line 10. Iron (III) chloride is fed from chlorination station F to leach station B via line 30. The operation of chlorination station F will be described in more detail hereinbelow.

While not wishing to be bound by any particular theory or mode of action, it is believed that, in leach station B, antimony trisulfide and iron (III) chloride react overall in the following manner:

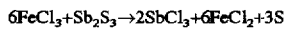

$$6FeCl_3 + Sb_2S_3 \rightarrow 2SbCl_3 + 6FeCl_2 + 3S$$

Thus, during the reaction, iron (III) chloride is reduced to iron (II) chloride. The antimony trichloride and iron (II) chloride generally remain in solution.

Preferably, the iron (III) chloride is used as an aqueous solution. While the source of iron (III) chloride is illustrated as chlorination station F, those of skill in the art will realize that an initial source of iron (III) chloride will be used. Preferably, the initial source of iron (III) chloride is an aqueous solution. Preferably, such an aqueous solution comprises from about 5% to about 15%, more preferably from about 8% to about 13%, most preferably from about 10% to about 12%, by weight iron (III). As is known in the, in order to dissolve these quantities of iron (III) in water, it is generally necessary to acidify the aqueous solution. For reasons which will become apparent hereinbelow, a preferred acid for this purpose is hydrochloric acid. Preferably, the hydrochloric acid has a concentration in the range of from about 0.05 to about 4.0, more preferably from about 0.1 to about 1, most preferably from about 0.1 to about 0.5, percent by weight.

Conveniently, the initial source of iron (III) chloride for use in the present process may be a waste stream from another industrial process. For example, a preferred initial source of iron (III) chloride for use in the present process is an iron containing waste stream from pickle liquor used in conventional steel manufacturing plants.

Preferably, the antimony trisulfide and the iron (III) chloride are contacted in leach station B at a temperature in the range of from about 50° to about 100° C., more preferably from about 60° to about 90° C., most preferably from about 75° to about 85° C.

Preferably, the antimony trisulfide and the iron (III) chloride are contacted in leach station B for a period of from about 10 to about 60 minutes, more preferably from about 25 to about 50 minutes, most preferably from about 30 to about 40 minutes.

To facilitate reaction of the antimony trisulfide and the iron (III) chloride, it is preferred to agitate the two. This can be accomplished using conventional mechanical mixers (e.g. rotary impellers) and the like.

In the present process, it is desirable that the antimony chloride-containing liquid emanating from leach station B via line 15 be substantially free of iron (III) chloride. The reason for this will be explained in more detail hereinbelow.

Thus, in a preferred embodiment, leach station B is divided into at least two stages (not shown). In the first stage, antimony trisulfide is reacted with less than a stoichiometric amount of iron (III) chloride. Preferably, the first stage comprises reacting antimony trisulfide with from about 60% to about 95%, more preferably from about 70% to about 90%, most preferably from about 75% to about 85%, of a stoichiometric amount of iron (III) chloride.

The advantage of this approach is that, in the first stage, since iron (III) chloride is present in a sub-stoichiometric amount, it substantially completely reacts with the antimony trisulfide which is present in excess in the first stage. The resulting reaction mixture comprises antimony trichloride and iron (II) chloride in solution, and unreacted antimony trisulfide and sulfur (a by-product of the reaction—see above) particles in suspension. The unreacted antimony trisulfide and sulfur particles may be separated from the reaction mixture using any conventional physical separation technique. The separated liquid (i.e. containing antimony trichloride and iron (II) chloride in solution) is then fed to solvent extraction station C via line 15.

The unreacted antimony trisulfide and sulfur particles from the first stage of leach station B are preferably then reacted in a second stage of leach station B. Preferably, the second stage of leach station B comprises reacting the antimony trisulfide particles from the first stage of leach station B with at least a substantially stoichiometric, preferably an excess stoichiometric, amount of iron (III) chloride. Thus, the reaction mixture produced in the second stage of leach station B comprises antimony trichloride, iron (II) chloride and iron (III) chloride in solution, and sulfur particles and other insoluble impurities in suspension. The sulfur particles and other insoluble impurities may be separated from the reaction mixture using any conventional physical separation technique and are fed to a waste disposal station (not shown) via a line 33. The separated liquid (i.e. containing antimony trichloride, iron (II) chloride and iron (III) chloride in solution) is then fed to the first stage of leach station B.

Thus, as will be appreciated by those of skill in the art, the product of leach station B is an aqueous liquid comprising antimony trichloride and iron (II) chloride in solution. The aqueous liquid comprising antimony trichloride and iron (II) in solution is fed to solvent extraction station C via line 15. As discussed above, it is preferred that the aqueous liquid fed to solvent extraction station C is the result of reaction of antimony trisulfide with a sub-stoichiometric amount of iron (III) chloride (e.g. from the first stage of leach station B discussed hereinabove).

In solvent extraction station C, the aqueous liquid comprising dissolved antimony trichloride and iron (II) chloride from leach station B is contacted with an organic solvent resulting in extraction of antimony trichloride from the aqueous liquid to the organic solvent. Ideally, the organic solvent for use in solvent extraction station C should be one which acts to complex one of antimony trichloride or iron (II) chloride to the exclusion of the other. In the context of the present process, it has been discovered that an organic solvent comprising tributyl phosphate is particularly well suited for this purpose. Specifically, when contacted with a mixture comprising both antimony trichloride and iron (II) chloride, tributyl phosphate will selectively complex with antimony trichloride.

Preferably, the organic solvent for use in organic solvent extraction station C comprises tributyl phosphate in an amount in the range of from about 20% to about 70%, more preferably from about 20% to about 60%, most preferably from about 20% to about 35%, by volume of the organic solvent. The remainder of the organic solvent may be any organic liquid which is miscible with and does not deleteriously affect the function of the organic solvent in solvent extraction station C. Preferably, the remainder of the organic solvent is kerosene.

To facilitate extraction of the antimony trichloride from the aqueous liquid into the organic solvent, it is preferred to agitate the two. This can be accomplished using conventional mechanical mixers (e.g. a rotary impeller) and the like.

Although not wishing to be bound by any particular theory or mode of action, it is believed that the following overall reaction occurs in solvent extraction station C:

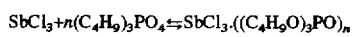

The antimony-organic complex believed to result from the reaction is readily soluble in the organic solvent in solvent extraction station C. The iron (II) chloride is minimally affected by contact with the tributyl phosphate and thus a majority remains in the aqueous solvent.

As described above, it is desirable in the present process to avoid the presence of iron (III) chloride from leach station B in solvent extraction station C. The principal reason for this is that the preferred extraction solvent comprising tributyl phosphate will not differentiate between antimony trichloride and iron (III) chloride. The result of this would defeat the purpose of solvent extraction station C, namely to separate substantially all of the antimony trichloride from the aqueous liquid from leach station B. This potential problem is mitigated or obviated by using the preferred two-stage design of leach station B discussed hereinabove.

Upon completion of extraction, the organic solvent (comprising dissolved antimony trichloride believed to be in the form of the antimony-organic complex referred to hereinabove) and the aqueous liquid are separated using conventional techniques such as phase separation and the like.

While the solvent extraction station C as described is effective for selective extraction of antimony trichloride, in certain cases trace amounts of iron (II) compounds may be concurrently extracted into the organic solvent. In such cases, after separation of the organic solvent from the aqueous liquid in solvent extraction C, it is preferred to scrub the organic solvent with an aqueous solvent which will selectively remove any trace amounts of iron (II) compounds present in the organic solvent. Preferably, the aqueous solvent used to scrub the organic solvent is an aqueous inorganic acid. In the context of the present process, aqueous hydrochloric acid has been found to be particularly useful to scrub the organic solvent and remove any trace amounts of iron (II) compounds which may be present in the organic solvent. Preferably, the aqueous inorganic acid comprises from about 1.0 to about 10.0, more preferably from about 4.0 to about 8.0, percent by weight hydrochloric acid. The use of acid in this manner also advantageously facilitates avoidance of partial hydrolysis of the antimony trichloride to antimony oxychlorides.

Once the organic solvent comprising antimony trichloride has been scrubbed (if necessary), it is desirable to contact the organic solvent with an aqueous solution capable of extracting antimony trichloride from the organic solvent to the aqueous solution. Thus, the purpose of this extraction is to strip the antimony trichloride from the tributyl phosphate-containing organic solvent. It has been discovered that an aqueous solution containing ammonium chloride is particularly well suited for this purpose. Preferably, the aqueous solution used for this purpose comprises ammonium chloride in an amount in the range of from about 125 to about 250 g/L, most preferably from about 200 to about 250 g/L.

Thus, solvent extraction station C preferably comprises separate stages for solvent extraction, scrubbing and stripping. In the solvent extraction stage, the ratio of the organic phase volume to the aqueous phase volume (hereinafter referred to as the O/A ratio) is preferably in the range of from about 1.0 to about 3.0, most preferably from about 1.8 to about 2.2. It is also preferred that the solvent extraction stage comprise from 1 to 4, most preferably 2, sequential tanks. In the scrubbing stage, the O/A ratio is preferably in the range of from about 2.0 to about 20.0, most preferably from about 3.0 to about 8.0. It is also preferred that the scrubbing stage comprise from 2 to 10, most preferably 4, sequential tanks. In the stripping stage, the O/A ratio is preferably in the range of from about 1.0 to about 3.0, most preferably from about 1.8 to about 2.2. It is also preferred that the stripping stage comprise from 4 to 8, most preferably 6, sequential tanks.

Thus, after the stripping operation in solvent extraction station C, an aqueous solution comprising ammonium chloride and substantially pure antimony trichloride is produced. This solution is then fed to hydrolysis station D wherein the antimony trichloride is hydrolyzed to produce antimony trioxide.

In a preferred embodiment of the present process, prior to hydrolysis station D, the oxidation-reduction potential (hereinafter referred to as ORP) of the aqueous solution comprising ammonium chloride (i.e. the solution from the stripping stage of solvent extraction station C) is determined and adjusted, if necessary, by addition any suitable oxidizing agent such as hydrogen peroxide, sodium hypochlorite or the like, such that the ORP is in the range of from about 5 to about 100 ORP, most preferably from about 20 to about 50 mV. Determination of ORP can be achieved using a conventional ORP probe and is within the scope of a person skilled in the art. It has been determined that control of the ORP in this manner improves the colour (i.e. the whiteness) of the antimony trioxide eventually produced.

In hydrolysis station D, it is preferred to contact the aqueous solution comprising antimony trichloride with an aqueous base to produce particulate antimony trioxide. The base should be one which is capable of converting the antimony trichloride to antimony trioxide—see, for example, Canadian patent 1,014,332 (Shafer), the contents of which are hereby incorporated by reference.

Preferably, the base is selected from the group comprising alkali metal bases (e.g. alkali metal chlorides and alkali metal hydroxides), alkaline earth metal bases (e.g. alkaline earth metal chlorides and alkaline earth metal hydroxides) and ammonium bases (e.g. ammonium hydroxide).

The most preferred base for use in hydrolysis station D is ammonium hydroxide. One of the significant advantages of using ammonium hydroxide is that, since it is the conjugate base of the preferred salt (i.e. ammonium chloride) used in the strip operation in solvent extraction station C, ammonium hydroxide may be readily recovered, recycled and reused in the present process. It is especially preferred to use a base comprising ammonium hydroxide at a concentration of from about 8 to about 30, most preferably from about 8 to about 12, percent by weight.

Preferably, the base is used in an amount to maintain the pH of the reaction mixture in the range of from about 7.0 to about 9.0, most preferably from about 8.0 to about 8.5. Maintaining the pH of the reaction mixture in this manner facilitates production of senarmontite crystalline form of antimony trioxide.

Although not wishing to be bound by any particular theory or mode of action, it is believed that, when ammonium hydroxide is used as the base in hydrolysis station D and pH is controlled to facilitate formation of the senarmontite crystalline form of antimony trioxide, ammonium hydroxide reacts overall with antimony trichloride in the following manner:

$$2SbCl_3 + 6NH_4OH \rightarrow Sb_2O_3 + 6NH_4Cl + 3H_2O$$

When ammonium hydroxide is used in hydrolysis station D, the reaction with antimony trichloride is exothermic. The water in the reaction system should be sufficient to absorb the heat of reaction from hydrolysis. However, in certain cases it may advantageous to cool the vessel in which hydrolysis occurs to maintain the temperature at less than about 40° C., preferably in the range of from about 0° to about 20° C., most preferably in the range of from about 10° to about 15° C.

Preferably, the antimony trichloride and the ammonium hydroxide are contacted in hydrolysis station D for a period of less than about 20 minutes, more preferably from about 5 seconds to about 15 minutes, most preferably from about 5 seconds to about 10 minutes.

Thus, after hydrolysis in hydrolysis station D, an aqueous liquid comprising substantially pure antimony trioxide in suspension is produced. This aqueous liquid containing antimony trioxide in suspension is then fed to dewatering/drying station E via line 25.

In dewatering/drying station E, the aqueous liquid is washed and dewatered using conventional counter-current washing/dewater techniques, preferably in a sequential manner. Thus, in drying station E, the aqueous liquid is initially fed to a conventional liquid/solid separator (not shown) wherein bulk antimony trioxide is separated from the aqueous liquid. The bulk antimony trioxide is then fed to a conventional drier (not shown), wherein drying of the antimony trioxide is effected. The dried antimony trioxide is then fed to a packaging station (not shown) wherein it is bagged or otherwise packaged for shipment to the end user.

As discussed hereinabove, one of the key advantages of the present process is the ability to recycle and reuse many of the reagents. The result of this is that the present process may be regarded as a substantially closed or near-closed loop, requiring little or no virgin reagents. Thus, the present process mitigates or obviates the high costs associated with purchase of virgin reagents for continuous production of antimony trioxide.

Thus, with reference to the accompanying FIGURE, the aqueous hydrochloric acid from the scrubbing operation (i.e. containing trace amounts of iron (II) compounds) of solvent extraction station C may be recycled to leach station B. This facilitates recovery of iron from solvent extraction station C.

A portion of the ammonium chloride produced as a by-product during hydrolysis may be recycled to solvent extraction station C wherein it may be used in the stripping operation discussed hereinabove. The remaining portion of the ammonium chloride may be fed to ammonium recovery station G. In ammonium recovery station G, the ammonium chloride is converted to ammonium hydroxide pursuant to the following overall reaction:

$$NH_4Cl + NaOH \rightarrow NH_4OH\uparrow + NaCl$$

The ammonium hydroxide is produced in gaseous form which may be readily absorbed by and dissolved in water to produce an aqueous solution of ammonium hydroxide. The aqueous solution of ammonium hydroxide may be recycled to the hydrolysis station D via line 95 wherein it may be used in the hydrolysis reaction discussed hereinabove. The sodium chloride solution is fed to brine purification station H. In brine purification station H, residual heavy metal impurities are removed from the sodium chloride solution.

The choice, design and operation of equipment for use in ammonium recovery station G and brine purification station H is within the purview of a person skilled in the art.

The concentrated sodium chloride solution produced in brine purification station H is fed to chloro-alkali electrolysis station I. In chloro-alkali electrolysis station I, the concentrated sodium chloride solution is electrolyzed to produce chlorine gas and sodium hydroxide. Hydrochloric acid is also a product of chlorine combination with hydrogen. While not wishing to be bound by any particular theory or mode action, it is believed that the following overall reactions occur in the chloro-alkali system:

$$2NaCl + 2H_2O \rightarrow Cl_2\uparrow + 2NaOH + H_2\uparrow H_2 + Cl_2 + \Delta \rightarrow 2HCl$$

A portion or all of the aqueous sodium hydroxide produced in chloro-alkali electrolysis station I is fed via line 65 to ammonium recovery station G wherein the aqueous hydroxide solution is used as described hereinabove to convert ammonium chloride to ammonium hydroxide. The remaining portion of the aqueous sodium hydroxide produced in chloro-alkali electrolysis station I may, if necessary, be fed via line 70 to brine purification station H wherein it may be used to adjust the pH of the concentrated sodium chloride solution eventually fed to chloro-alkali electrolysis station I. The hydrochloric acid produced in chloro-alkali electrolysis station I may be recycled to: line 40 (containing ammonium chloride) via line 80 and/or solvent extraction station C via line 90.

The choice, design and operation of equipment for use in chloro-alkali electrolysis station I is within the purview of a person skilled in the art.

A portion of the chlorine gas produced in chloro-alkali electrolysis station I is fed to chlorination station F via line 60. In chlorination station F, chlorine gas reacted with iron (II) chloride from solvent extraction station C pursuant to the following overall reaction:

$$2FeCl_2 + Cl_2 \rightarrow 2FeCl_3$$

Thus, chlorination station F serves to regenerate iron (III) chloride which is then recycled to leach station B via line 30.

The choice, design and operation of equipment for use in chlorination station F is within the purview of a person skilled in the art.

While specific illustrated embodiments have been discussed hereinabove with respect to the attached drawings, it should be clearly understood that variations to and modifications of the illustrated embodiments will become apparent to those of skill in the art which do not depart from and are intended to be included within the spirit and scope of the invention. It is the intent of the Applicant that such variations and modifications are included with in the sprit and scope of the invention.

What is claimed is:

1. A process for the production of antimony trioxide comprising the steps of:

(i) reacting antimony trisulfide with iron (III) chloride to produce a first aqueous solution comprising antimony trichloride, and contacting the first aqueous solution with an organic solvent resulting in extraction of antimony trichloride from the first aqueous solution; and (ii) hydrolyzing the extracted antimony trichloride to produce antimony trioxide.

2. The process defined in claim 1, wherein the antimony trisulfide is present in the form of a concentrate containing at least about 70% by weight antimony trisulfide.

3. The process defined in claim 1, wherein the iron (III) chloride in Step (i) is in the form of an aqueous solution.

4. The process defined in claim 3, wherein the aqueous solution comprises from about 5% to about 15% by weight iron (III).

5. The process defined in claim 1, wherein Step (i) is conducted at a temperature in the range of from about 50° to about 100° C.

6. The process defined in claim 1, wherein Step (i) is conducted over a period of from about 10 to about 60 minutes.

7. The process defined in claim 1, wherein Step (i) is conducted in the presence of an acid.

8. The process defined in claim 7, wherein the acid is hydrochloric acid at a concentration of from about 0.05 to about 4.0 percent by weight.

9. The process defined in claim 1, wherein Step (i) comprises a first stage comprising reacting antimony trisulfide with less than a stoichiometric amount of iron (III) chloride.

10. The process defined in claim 9, wherein the first stage comprises reacting antimony trisulfide with from about 60% to about 95% of a stoichiometric amount of iron (III) chloride.

11. The process defined in claim 9, wherein the second stage of Step (i) comprises reacting antimony trisulfide with at least a stoichiometric amount of iron (III) chloride.

12. The process defined in claim 1, wherein the ratio of the volume of the organic solvent to the volume of the first aqueous solution is in the range of from about 1 to about 3.

13. The process defined in claim 1, wherein the organic solvent comprises tributyl phosphate.

14. The process defined in claim 13, wherein the tributyl phosphate is present in an amount in the range of from about 20% to about 70% by volume of the organic solvent.

15. The process defined in claim 1, wherein the organic solvent comprises kerosene.

16. The process defined in claim 1, wherein the organic solvent containing extracted antimony trichloride is contacted with an aqueous acid.

17. The process defined in claim 16, wherein the ratio of the volume of the organic solvent to the volume of the aqueous acid is in the range of from about 2 to about 20.

18. The process defined in claim 16, wherein the aqueous acid comprises aqueous hydrochloric acid.

19. The process defined in claim 1, wherein the organic solvent comprising extracted antimony trichloride is contacted with a second aqueous solution resulting in extraction of antimony trichloride from the organic solvent to the second aqueous solution.

20. The process defined in claim 19, wherein the ratio of the volume of the organic solvent to the volume of the second aqueous solution is in the range of from about 1 to about 3.

21. The process defined in claim 19, wherein the second aqueous solution comprises ammonium chloride.

22. The process defined in claim 19, wherein the second aqueous solution comprises ammonium chloride in an amount in the range of from about 125 to about 250 g/L.

23. The process defined in claim 1, wherein Step (ii) comprises contacting the antimony trichloride with an aqueous base to produce particulate antimony trioxide in a second aqueous solution.

24. The process defined in claim 23, wherein Step (ii) is conducted at a pH in the range of from about 7.0 to about 9.0.

25. The process defined in claim 23, wherein the aqueous base is selected from the group consisting of akali metal bases, alkaline earth metal base and ammonium bases.

26. The process defined in claim 23, wherein the aqueous base comprises ammonium hydroxide.

27. The process defined in claim 1, wherein Step (ii) is conducted for a period of less than about 20 minutes.

28. The process defined in claim 1, wherein Step (ii) is conducted at a temperature of less than about 40° C.

29. The process defined in claim 23, wherein after Step (ii), the particulate antimony trioxide is separated from the second aqueous solution.

* * * * *